Patented Jan. 6, 1953

2,624,759

UNITED STATES PATENT OFFICE 2,624,759

SUBSTITUTED POLY ARALKYL ALKYLENE POLY AMINO POLY ACETIC ACIDS AND SALTS

Frederick C. Bersworth, Verona, N. J.

No Drawing. Application November 1, 1950,
Serial No. 193,545

5 Claims. (Cl. 260—518)

This invention relates to metal ion chelating compounds for use in aqueous solutions and has for its object the provision of a metal ion chelating compound which is utilizable in acid as well as alkaline pH solutions.

A further object is to provide a bactericidally active metal ion sequestering agent.

Still another object is to provide a metal ion sequestering agent that is particularly effective toward poly-valent heavy metals and metals of the so-called transition group of metals consisting of copper, nickel, cobalt, and the like.

Other objects will be apparent as the invention is more fully disclosed.

In accordance with these objects, I have discovered that substituted poly alkylene polyamine polyacetic acids corresponding to the formula:

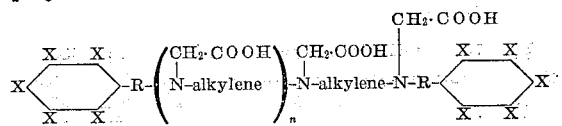

where $n=1, 2, 3, 4$; X=hydrogen, alkyl, halogen, hydroxyl of alkoxyl; alkylene=ethylene, propylene, trimethylene, and R is a $(CH_2)_n$ group wherein $n$ is a numeral of the group consisting of 1 to 5, are highly water soluble bactericides and fungicides having a strong sequestering power for metal ions (particularly the transition metals) in aqueous solution. The alkali metal salts are the most powerful sequestering agents, but the amino acids themselves are reactive toward such metals as Cu, Co, Ni, etc., i. e., the metals are chelated in acid as well as alkaline solutions.

In general, the sequestering action with alkaline earth ions is relatively weaker compared to such reagents as ethylene diamine tetraacetic acid, and these compounds are less useful for simple water softening. However, their high affinity for the transition metals render them effective antioxidants in aqueous solution, or in materials which are to be used in or with water such as for instance bar soap with which they are highly compatible and perform multifunctional i. e., are anti-oxidants over long period of storage, protect the soap against water hardness when used and being germicidally and fungicidally active, tend to sterilize when used. They are excellent adducts to elastomers both synthetic and natural and act as plasticizers and accepters and inhibitors of detrimental metal ions.

They are excellent as reclaiming agents for natural and synthetic rubber being soluble in such rubber products and active to remove the vulcanization metal catalyst in non-ionic form. The chelates themselves may be used to introduce a desired metal into the plastic mixture to act as inhibitors aligo dynamic catalyst when so activated by temperature or working pressure, etc. The compounds are especially useful as oil additives both per se and in form of chelates to either act as emulsant viscosity control and/or as aid in lubrication or combustion. Of the compounds specifically disclosed, it was found that the bactericidal and fungicidal activity was greatest when both halogen and hydroxyl groups were present on the aromatic ring. This and their varying solubility in water and emulsion makes them desirable adducts to metal working emulsion type of lubricants as antobiotics. The amine salts are more soluble in organic systems than are the alkali metal salts although the potassium salts show remarkable solubility in polar solvents.

Example I

Two moles of 4-hydroxy-2,6-dichlorobenzyl chloride are reacted with one mole of diethylene triamine in aqueous ethanol by the gradual addition of an ethanol solution of the halide to the amine; the reaction mixture being maintained at vigorous reflux. The addition is made over a period of 3-4 hours and the reaction is completed by reflux for an additional hour. The product is mainly (about 75%) the dihydrochloride of the following base:

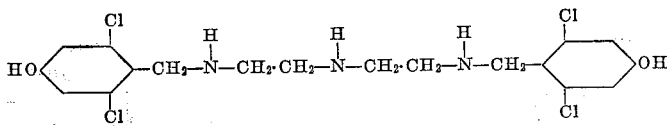

To obtain the free base of the compound, the reaction mixture is treated with 2 moles of sodium hydroxide and agitated until all chloride ion is reacted to form sodium chloride. This is filtered off as it is precipitated and the final filtrate may be vacuum dried and the organic free base extracted with alcohol to obtain a product practically free from inorganic salt. The resulting diethylene triamine derivative is dissolved in anhydrous ethanol and is carboxymethylated in accordance with the carboxymethylation reaction described in my Patents Nos. 2,387,735, 2,407,645 and 2,461,519, using 3 moles of sodium cyanide and 3 moles of $CH_2O$ and maintaining alkaline conditions in the reaction solution. The carboxymethylation reaction proceeds smoothly with good agitation at a reaction temperature of about 100° C. The resulting carboxymethylated product is the trisodium salt of di-(2,4-dichloro-4-hydroxy benzyl)-diethylene triamine triacetic acid having the formula:

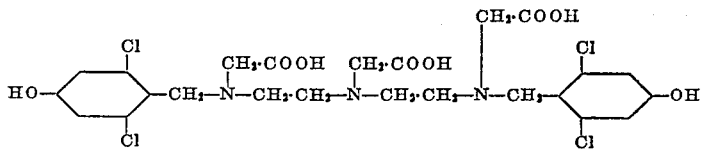

It may be obtained as the crystalline sodium salt by evaporation of most of the water and adding alcohol sufficient to provide about a 50/50 alcohol-aqueous solution.

The free amino acid is obtained by acidification of the reaction solution with a mineral acid (such as HCl), evaporating to dryness, and leaching with warm absolute ethanol. The purified amino acid may be isolated in crystalline form relatively free from inorganic salts by evaporation of the alcohol extract.

*Example II*

I have found that dipropylene triamine may be substituted for diethylene triamine in Example I to give a product having the formula:

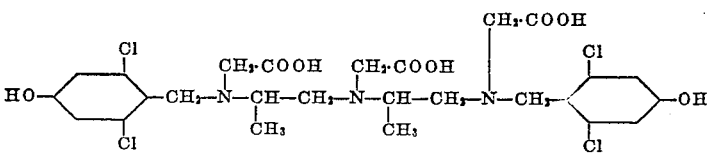

The methyl group increases the solubility of the amino acid in organic solvents.

I have found that the process of Example I may also be used to prepare similar chelating agents in which the substituents on the ring, the length of the chain (R) between the ring and the amino groups; and the alkylene groups are varied.

*Example III*

Thus the use of p-hydroxybenzyl chloride as the halide and di-trimethylene triamine

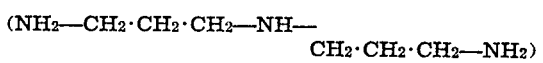

as the base resulted in the formation of an analogous amino acid which must have the formula:

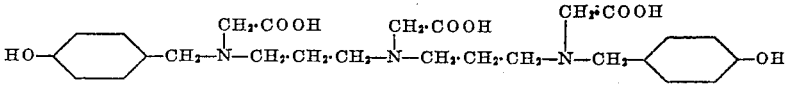

The water solubility of this compound and its metal chelates is somewhat greater than that of the halide derivatives described in Examples I and II. Further, this substance is a useful intermediate for the further substitution of halogen in the aromatic ring, to give from 1 to 4 halogens in the positions. When two halogens are introduced it is believed that they are attached at the positions marked by X.

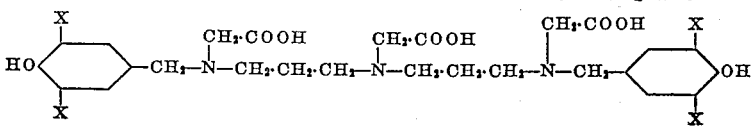

*Example IV*

Similarly, the process of Example I was found satisfactory for the synthesis from p-chlorophenylpentylchloride and diethylene triamine of the amino acid having the formula:

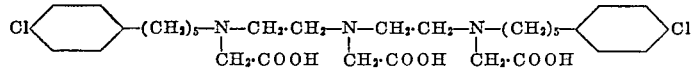

This substance is somewhat less water soluble than the product of Example I but it is more surface active as well as having the other desirable properties of the products of this invention.

The polyalkylene polyamine bases employed in the above examples are generally recognized by members of the general class of compounds expressed by the formula:

$$NH_2-(alkylene-NH)_n-alkylene-NH_2$$

where $n$ is a small integer. The bases of this type in which $n$ varies from one to four inclusive are well known, and the ethylene and propylene bases are readily available commercially. I have found that such polyethylene bases may be used as substantial equivalents for those in the examples above, the products having in general the expected structure. I have found for example, that the use of tetraethylene pentamine in place of diethylene triamine of Example I produces a similar bactericidal and fungicidal chelating agent which is water soluble. Thus far I have failed to obtain the amino acid in pure form, although its alkali metal salt is a crystalline material. This is probably due to impurities resulting from side reactions in the substitution of the polyalkylene polyamine with the alkyl halide to give some substitution on the secondary nitrogens of the polyamine. The product, however, was a powerful chelating agent and contained five acetic acid groups after carboxymethylation. It is believed that a large proportion of the reaction product consists of the analogous compound having the formula:

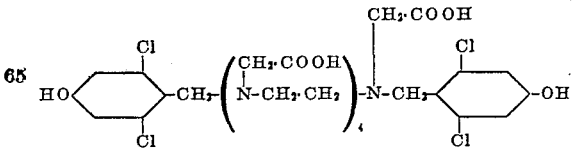

The reaction of the dialkylene triamine chelates was found to involve a 1:1 combination of heavy metals to give chelates having the formula:

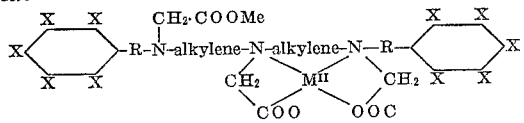

This accounts for the sequestering action of the amino acid for divalent metal, and the free salt-forming acetic acid group apparently accounts for the solubility of the metal chelate in water.

I have also found that the compounds of the present invention which are derived from the higher polyalkylene polyamines sequester more than one mole of metal per mole of chelating agent. For example, it was found that a single disubstituted triethylene tetraamine tetraacetic acid combined with two moles of copper$^{II}$ ions to give an inner complex salt presumably having the following structure:

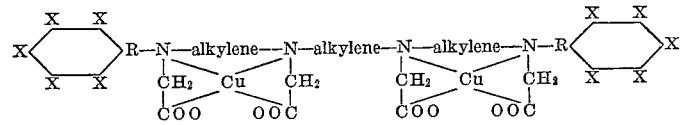

Although the structure given here shows that all salt forming (solubilizing) groups are neutralized, forming non-ionic chelate, they do not precipitate in alkaline solution. It appears that secondary salt formation occurs, probably a phenolate.

Having hereinabove described the present invention generically and specifically and given several specific examples of the same by way of illustration but not by way of limitation, it is believed apparent that the invention may be widely varied without essential departure therefrom and all such modifications and adaptations of the same are contemplated as may fall within the scope of the following claims:

What I claim is:

1. The compound conforming to the structural formula:

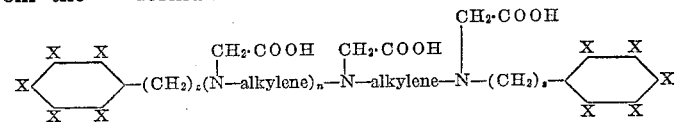

wherein $z$ is a numeral of the group consisting of 1 to 5; alkylene is one of the group consisting of $CH_2 \cdot CH_2$, $CH_2 \cdot CH_2 \cdot CH_2$ and $CH(CH_3) \cdot CH_2$; X is one of the group consisting of hydrogen, alkyl, alkoxyl, hydroxyl and halogen with one to three X being halogen, and $n$ is a numeral selected from the group consisting of 1 to 4.

2. The compound conforming to the structural formula:

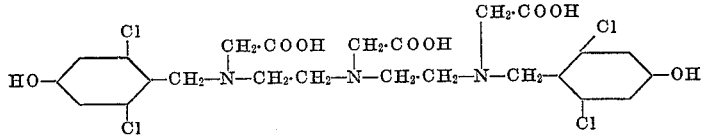

3. The compound conforming to the structural formula:

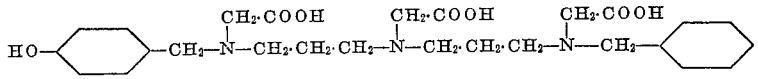

4. The compound conforming to the structural formula:

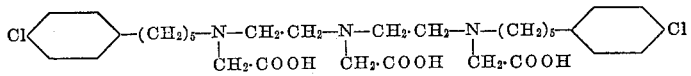

5. The compound conforming to the structural formula:

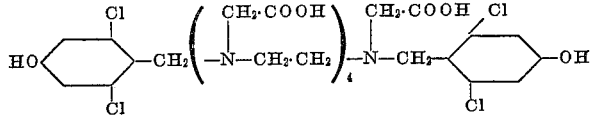

FREDERICK C. BERSWORTH.

REFERENCES CITED

The following references are of record in the file of this patent:

UNITED STATES PATENTS

| Number | Name | Date |
|---|---|---|
| 868,294 | Schmidlin | Oct. 15, 1907 |
| 932,266 | Fussenegger | Aug. 24, 1909 |
| 2,195,974 | Reppe et al. | Apr. 2, 1940 |
| 2,489,363 | Bersworth | Nov. 29, 1949 |

FOREIGN PATENTS

| Number | Country | Date |
|---|---|---|
| 18,095 | Great Britain | of 1913 |
| 642,244 | Germany | Mar. 6, 1937 |

OTHER REFERENCES

Alphen: Chem. Abs., vol. 38, col. 4943 (1944).